United States Patent
Aykin

(10) Patent No.: US 6,516,301 B1
(45) Date of Patent: Feb. 4, 2003

(54) ORDER-BASED MATERIAL MANAGEMENT SYSTEM

(75) Inventor: Turgut Aykin, Union Beach, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/304,294

(22) Filed: May 3, 1999

(51) Int. Cl.[7] ............................................... G06F 17/60
(52) U.S. Cl. ............................................ 705/10; 705/8
(58) Field of Search ....................................... 705/10, 8

(56) References Cited

U.S. PATENT DOCUMENTS 6,151,582 A * 11/2000 Huang et al. .................. 705/8
6,205,431 B1 * 3/2001 Willemain et al. ............ 705/10

OTHER PUBLICATIONS

Shunsky, Robert A. Flexible Service Capacity Sep. 2000.*
Kaipia, Riika "On the Way To Supply Cahin Collaboration".*
Hausman, W.H., H.L. Lee, and A.X. Zhang, "Joint Demand Fulfillment Probability in a Multi–Item Inventory System with Independent Order–Up–To Policies," *European Journal of Operational Research*, 101–114, 1997.
Johnson, E.M., H.L. Lee, T. Davis, and R. Hall, "Expressions for Item Fill Rates in Periodic Inventory Systems," *Naval Research Logistics*, 57–80, 1995.
Nahmias, S., *Production and Operations Analysis*, 2nd ed., Irwin Publ., 1993.
Silver, E. A., "A Modified Formula for Calculating Customer Service Under Continuous Inventory Review," *AIIE Transactions*, 241–245, 1970.
Silver, E.A., D.E. Pyke, and R. Peterson, *Inventory Management and Production Scheduling*, 3rd ed., John Wiley and Sons, 1998.
Tong, Y.L., *The Multivariate Normal Distribution*, Springer–Verlag, New York, 1990.

* cited by examiner

Primary Examiner—Kyle J. Choi
Assistant Examiner—James A. Reagan
(74) Attorney, Agent, or Firm—Brown, Pinnisi & Michaels, PC

(57) ABSTRACT

An Order Based Materials Management (OBMM) method using forecasts of actual customer orders to determine component stocking levels. There may be several types of orders and several types of customer demand forecasts for them. Each order type is specified by a variable Bill Of Materials called an "order profile"—a multivariate probability distribution with each random variable representing the uncertain number of units of a component or subassembly that may be needed to build a customer order of that type. The profile of an order type is represented by a multivariate probability distribution of all components/subassemblies that may be needed for an order of that type, including the correlation between the numbers of units of different components needed for an order in the analysis. Using i) the desired order fill rate, ii) component lead times, iii) forecasts, and iv) forecast error variances and their distributions, OBMM determines a target number of orders for each order type over the lead times (plus one review period) for which to maintain materials. To determine component level orders and inventory quantities to achieve the desired order fill rate, target numbers and order profiles are then combined to obtain a joint multivariate distribution of components that may be needed for the target numbers of orders. Order-up-to periodic inventory policies (including safety stocks) for components and subassemblies are developed recursively from this combined multivariate distribution.

20 Claims, 3 Drawing Sheets

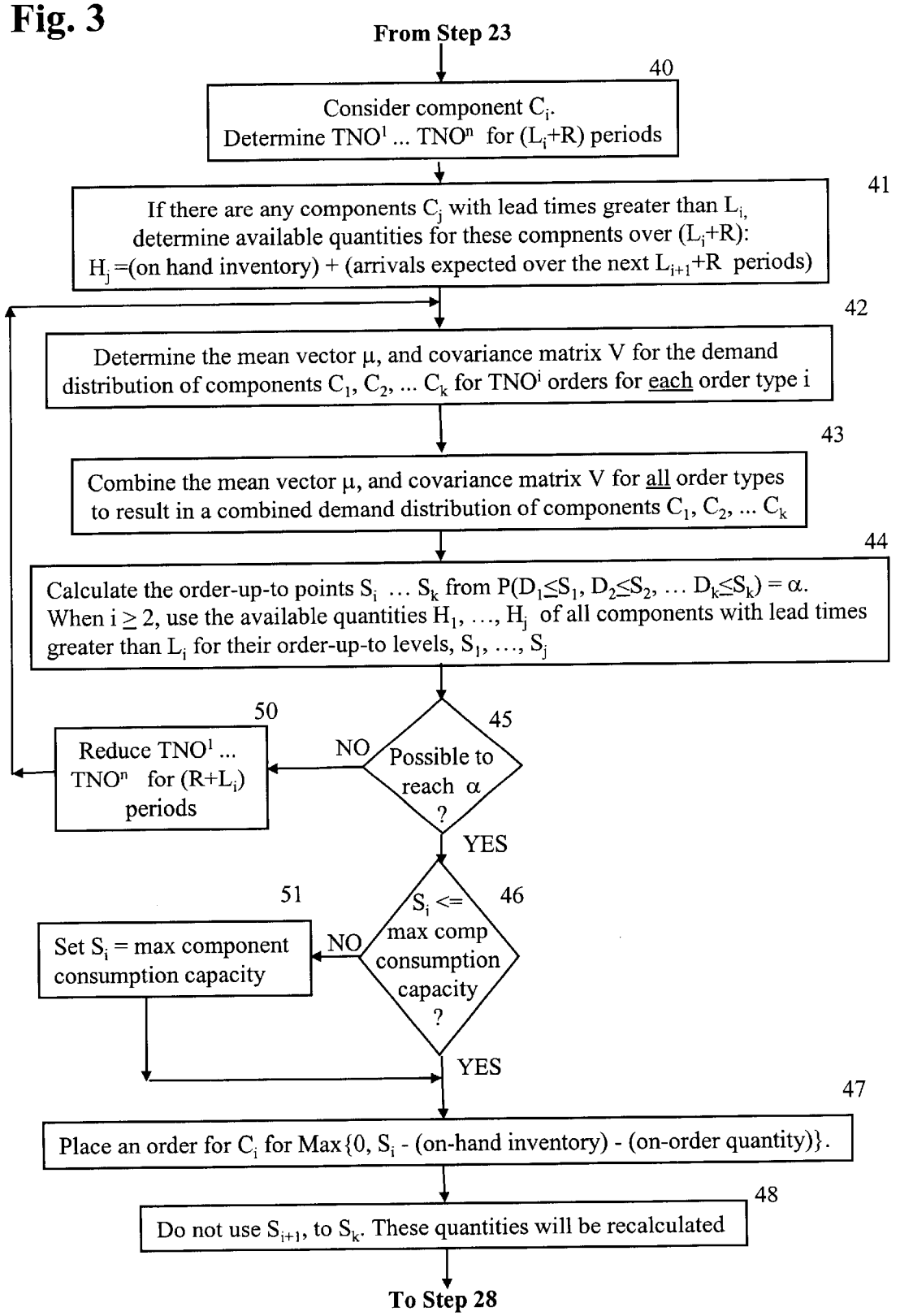

ORDER-BASED MATERIAL MANAGEMENT SYSTEM

FIELD OF THE INVENTION

The invention pertains to the field of manufacturing methods. More particularly, the invention pertains to methods of ordering and managing part and component inventories for services or manufacturing.

BACKGROUND OF THE INVENTION

The problem of determining the amount of components and subassemblies that are to be carried in inventory in a factory to meet customer demand has a long history. The complexity of the problem in practice depends on, among other things, the nature of customer demand, supplier lead times, and product structure involved. In most cases, customer demand and supplier lead times are probabilistic. The product structure may require a constant number of units of a list of components per unit of the finished product ("fixed bill-of-materials") or depend on the customer order ("variable bill-of-materials"). The latter is the case in produce-to-order (engineer-to-order, assembly-to-order) type systems.

The complexity of the material management problem in the production of products with fixed and variable bills-of-materials (BOM) is significantly different. When a product consists of a known number of units of a fixed list of components (fixed bill-of-materials), there are well established techniques such as the traditional inventory control techniques, Material Requirements Planning (MRP), and their extensions (Nahmias, 1993) to manage component, subassembly, and other material inventories. When a product is built according to a customer order (such as Lucent's 5ESS switch), the set (list) of components/subassemblies as well as the number of units of each component in the set needed for the product may change from one order to another, making the material management problem extremely complex.

The traditional inventory control techniques, MRP system, and their extensions were originally developed for products with fixed bill-of-materials. They are primarily used for material ordering and management. MRP, for instance, takes either demand forecasts for a finished product or scheduled production quantities for it from a production plan, and determines the numbers of components and subassemblies to be ordered/produced by multiplying the required production quantities by the fixed numbers of units of components and subassemblies specified in the product's fixed BOM. To determine when they should be ordered/produced, it uses the supplier and manufacturing lead times. Some factories also try to use this approach to manage materials for complex products with variable BOM's by first defining building blocks (large subassemblies) that go in to a customer order. The number of units of different building blocks required by an order may vary from order to order as well as blocks' contents (i.e. components and subassemblies in each). With this approach, customer demand is forecasted at building block level. It is then converted in to component level requirements assuming that each building block has a fixed bill-of-material. Composition of a "typical" is obtained from the variable BOM by simply setting the number of units of a component needed per building block equal to a fixed number in order to cover most orders. Hence, this modified MRP approach would not result in effective management of materials.

None of the existing material management systems links material ordering and inventory control policies with the desired customer service levels in manufacturing products with variable BOM. For instance, the whole order delivery (WOD) performance (or its variants) is one of the critical customer service metrics tracked by factories operating in a manufacture-to-order environment. It is defined as the percentage of customer orders completed within the time interval promised to customers over a period of time (e.g. a week, a month). It is considered to be an indicator of customer satisfaction in terms of timeliness of order completion. As known, material availability is one of the most critical determinants of WOD performance. Without needed materials, an order can not be started, resulting in delays and late completion of it. Specifically, the percentage of the times an arriving order facing no material shortages (referred to as 'the order fill rate' in what follows) has a direct relationship with the WOD performance of such a factory. Instead of determining the amount of components, subassemblies, and other materials needed to be ordered and carried in inventory to reach the desired order level fill rate, all existing material management systems determine these quantities for each component/subassembly separately (without taking the order composition and order to order variations), and hope that, if they are high enough, the desired order fill rate will be reached. Thus, these approaches fail to link the material requirements with the performance metrics in a manufacture-to-order environment. The order based material management system described here addresses this problem and links, for the first time, the customer service objectives such as the order fill rate and delivery interval targets with the material requirements in a produce-to-order environment.

SUMMARY OF THE INVENTION

The material management technique of the invention is for managing materials in factories producing highly customized products. It may be used for planning and ordering components/subassemblies and other types of material, timing of these orders, and determining appropriate inventory levels to reach the desired order fill rate targets at factories producing complex products with variable bills-of-materials.

The Order Based Materials Management (OBMM) method of the invention uses forecasts of actual customer orders (not building block or component level demand forecasts) to determine component stocking levels. There may be several types of orders (an order type may be a particular model with different options or size that can form a complete customer order) and customer demand forecasts for them. Each order type is specified by a variable BOM called an "order profile". An order profile is represented by a multivariate normal probability distribution (a joint normal probability distribution of two or more variables) with each random variable representing the uncertain number of units of a component or subassembly that may be needed to build a customer order of that type. Thus, the numbers of units of different components/subassemblies needed to build a certain type of order are uncertain (i.e. a variable BOM). The profile of an order type is a joint multivariate distribution of all components/subassemblies (or so called "Type A" items in material management literature) that may be needed for an order of that type. Thus, it also captures the correlation between the numbers of units of different components that may be needed for orders of a particular type.

Given order level forecasts and order profiles for different order types, the method of the invention uses a desired "order fill rate" (that is, on average, the percentage of the times all components needed for an order will be available in inventory when the order arrives) to determine the needed component/subassembly buffer levels. As explained before, the order fill rate is one of the important factors affecting the Whole Order Delivery (WOD) performance. The time characteristics of final assembly and test operations, and delay time distribution (expedition) when there are material shortages are among the other factors affecting the WOD performance.

Using i) the desired order fill rate, ii) order profiles, iii) component lead times, iv) forecasts, and v) forecast error variances, OBMM next determines the target number of orders over the lead times plus one review period for which to maintain materials. If materials for this target number of orders are planned for, and ordered and arrive on time, the average order fill rate over time will be the target order fill rate value.

To determine component level orders and inventory quantities to achieve the desired order fill rate for each order type, this target number and order profile are then combined to obtain a joint multivariate normal distribution of components that may be needed for the target number of orders. The joint distributions for different order types are combined using the statistical properties of these distributions. This allows the invention to take advantage of the component commonalties between order types. Order-up-to periodic inventory policies, also known as the (S, R) system (Silver and Peterson, 1998) for components and subassemblies are then developed from this combined multivariate distribution.

In summary, the method of the invention starts with the desired order fill rate. Using the desired order fill rate, order level forecasts, and forecast error variances, it first obtains target numbers for different order types. Combining the target numbers with the associated order profiles, an overall multivariate component demand distribution is obtained. And finally, from that multivariate distribution, it determines order-up-levels for components to achieve the desired order fill rate.

BRIEF DESCRIPTION OF THE DRAWING

FIG. 3 shows a detail flowchart of the steps from FIG. 2 enclosed in the dotted lines labeled "3".

DESCRIPTION OF THE PREFERRED EMBODIMENT

Figure 1:
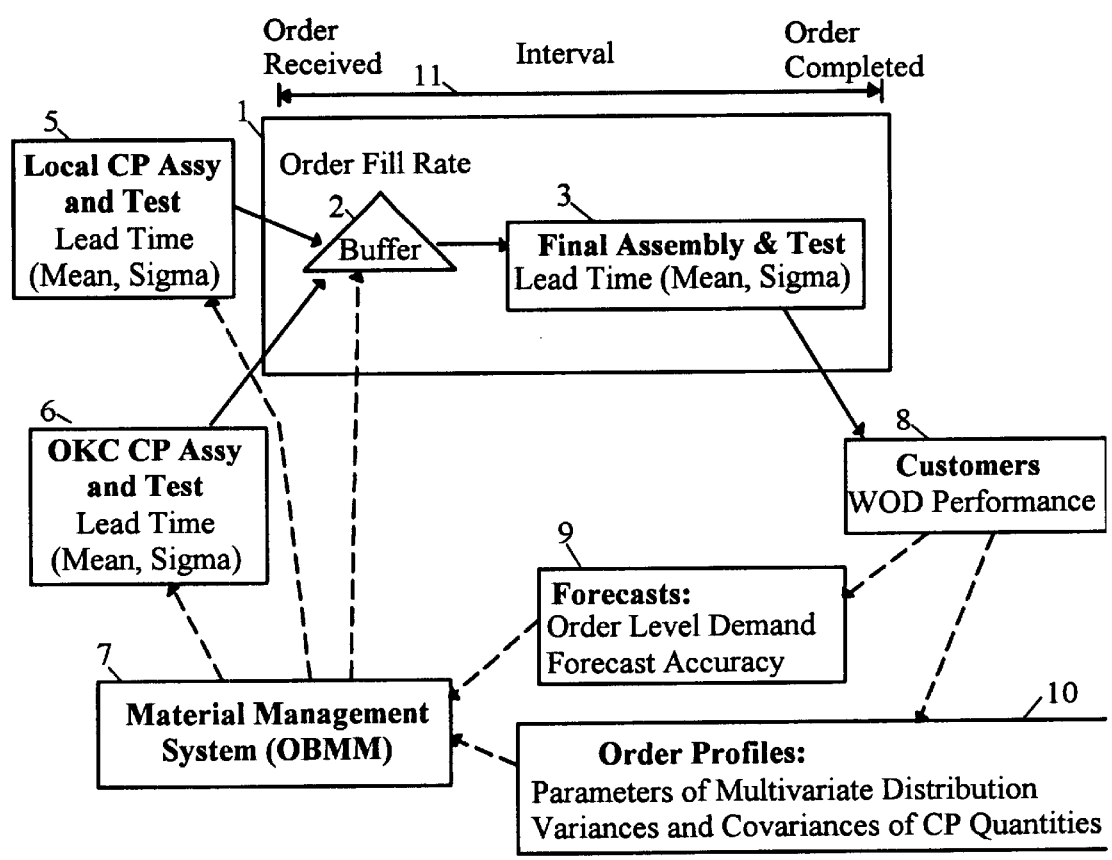
FIG. 1 shows a block diagram of a conceptual single-factory performance model.

FIG. 1 shows a block diagram of a single-factory, diagramming the interactions of the various functions with the method of the invention (7) and the factory (1).

Component and subassemblies are ordered either from outside facilities (5) or produced internally (6), and delivered into the "buffer" (2) in the factory (1), from which they are drawn and assembled in the final assembly and test process (3).

An order is a customer request for a complete functioning product (system). The factory's customers (8) place orders, which they expect to be delivered within the promised delivery interval.

An important performance metric monitored in this type of systems is the Whole Order Delivery (WOD) performance, generally expressed as the percentage of orders completed on or before the promised delivery time. The factors which affect the WOD performance are:

(1) The interval (11) between receipt of order and completion;

(2) The factory capacity (queueing delays);

(3) Material availability (i.e. order fill rate); and (4) The delay, when there is a material shortage.

If the promised interval is T days, then the WOD Performance (percentage of orders completed on or before T) can be approximated by:

$$P\begin{pmatrix} \text{completing} \\ \text{an order on or} \\ \text{before } T \text{ days} \end{pmatrix} = P\begin{pmatrix} \text{completing} \\ \text{an order on or} \\ \text{before } T \text{ days} \end{pmatrix} \begin{vmatrix} \text{Order Start} \\ \text{with no Matl} \\ \text{Shortage} \end{vmatrix} \times$$

$$P\begin{pmatrix} \text{Order Start} \\ \text{with no Matl} \\ \text{Shortage} \end{pmatrix} +$$

$$P\begin{pmatrix} \text{completing} \\ \text{an order on or} \\ \text{before } T \text{ days} \end{pmatrix} \begin{vmatrix} \text{Order Start} \\ \text{with Material} \\ \text{Shortage} \end{vmatrix} \times$$

$$P\begin{pmatrix} \text{Order Start} \\ \text{with Material} \\ \text{Shortage} \end{pmatrix}$$

When there is no material shortage, the probability of completing an order on or before T days is determined by the processing time needed and possible delays when there is congestion due to capacity problems. When there are material shortages, however, orders will be delayed until the needed materials become available. This will naturally delay the completion time of the order. Normally, T is chosen so that, in the absence of any delays, an order can be completed within the promised interval. When the facilities are congested (due to heavy load in peak demand periods, for example), T is adjusted to allow time for queuing delays. The only material related factor determining the WOD performance is the order fill rate, that is P(order start with no material shortage). It can be set independently as in the traditional inventory control techniques or in accordance with the WOD target. The Order Based Material Management method of invention uses the order fill rate to determine component stocking levels in a produce-to-order environment.

There may be several types of orders (an order type may be a particular model with different options or size), and customer demand forecasts for them.

Figure 2:
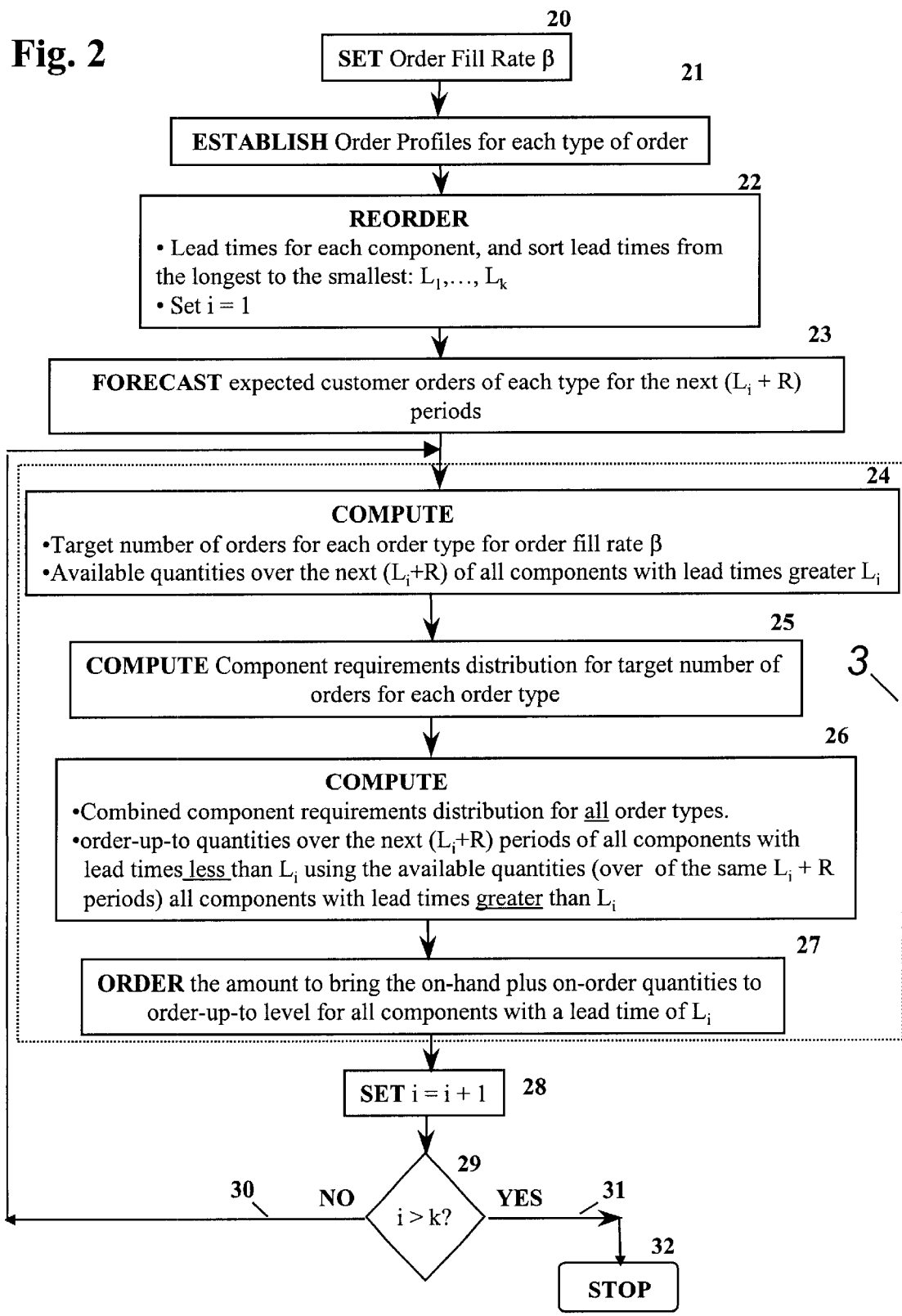
FIG. 2 shows a flowchart of the method of the invention.

The method of the invention will be discussed in the context of several examples of increasing complexity, below. The following description, referring to FIG. 2, is presented at this point to explain the method in its general case, before proceeding to the more specific examples.

Description of the Method

Step 20: SET: Order fill rate $\beta$ is set.

Step 21: ESTABLISH: Order profiles are established for each type of order. An order profile is a multivariate probability distribution (a joint probability distribution of two or more variables) with each random variable representing the uncertain number of units of a component or subassembly that may be needed to build a customer order of that type. Thus, the numbers of units of different components/subassemblies needed to build an order of a particular type are uncertain (i.e. a "variable BOM").

Step 22: REORDER: The lead times for each component/subassembly in the order profile is set in step (22), and the list of lead times is sorted into inverse order from longest to shortest. Counter "I" is set to 1, in preparation for the iteration of the method.

$L_{MAX}$ is set to the first (i.e. longest) lead time after the sorting step, above.

Step 23: FORECAST: The Order Based Materials Management (OBMM) method of the invention uses forecasts (9) of actual customer orders (not building block or component level demand forecasts) to determine component stocking levels, for the lead time plus review ($L_1$+R) period.

Step 24: COMPUTE: using i) the order fill rate, ii) component lead times, iii) forecasts, and iv) forecast error variances and their distributions, OBMM next determines the target number of orders over the lead times (plus one review period) for which to maintain materials, and the available quantities of components with lead times greater than the component being considered.

Step 25: COMPUTE: The component requirements distribution for the target number of orders of each order type are computed.

Step 26: COMPUTE: The component requirements distribution is computed for all order types, and the order-up-to quantities are computed for all components with shorter lead times than the one being considered, using the available quantities of all components having longer lead times.

Step 27: ORDER: The component is ordered in an amount to bring the on-hand plus on-order quantity to the order-up-to level. (steps 25 through 27 are iterated for each component)

Step 28: SET: The index "i" is incremented.

Step 29: COMPARE: The index is compared against the number of components "k". If it is less than or equal to k, the method loops back (30) to step 24 If i is greater than k (31), then the method stops (step 32).

As in any material management system, this method will be executed periodically (daily, weekly, or any time the organization reviews its materials needs and forecasts). In the following this period will be referred to as "R".

Specific Description of the Method

EXAMPLE 1

One Order Type, Consistent Lead Times

To facilitate the presentation of the method of the invention, this discussion will first assume that there is only one order type and all components and subassemblies used have the same lead time. The case involving multiple order types, and components with different lead times will be considered later in this section.

The Target Number of Orders for the lead time plus review period ($TNO_{t,(R+L)}$) at time t can be calculated (25) as follows:

$$TNO_{t,(R+L)} = F_{t,(R+L)} + z(\sigma_{t,(R+L)})^{0.5}$$

where:

$F_{t,(R+L)}$ is the forecast made at time t of the number of orders (starts) during the next (R+L) periods, where L is the lead time and R is the review period.

z is a safety factor for the desired order fill rate (fraction of orders filled directly from buffer (2)) of β. In other words, if the component buffer levels are set to meet possible component demand by up to the target number of orders ($TNO_{t,(R+L)}$) 100% of the time, then the average percentage of orders filled from the buffer will be β. The safety factor may be calculated by any of the known methods, such as those recommended by Silver (1970) or Johnson, et. al (1995).

$\sigma_{t,(R+L)}$ is the variance of forecast error over the lead time plus review period. For notational convenience, we denote the standard deviation by $\sigma^{0.5}$.

Next, the component level orders and inventory quantities (step (26), first and second parts) to achieve the desired order fill rate for each order type are determined. For this, the target number of orders and order profile are combined (step (26), third part) to obtain a joint multivariate distribution of components that may be needed for the target number of orders. Order-up-to periodic inventory policies (including safety stocks) for components and subassemblies are then developed (step (27)) from this combined multivariate distribution, and the orders are placed (step (28)) as needed.

If the preset number of intervals k has not been exceeded (32), the forecasts are revised (step (24)) in accordance with actual orders and performance figures and the system loops back to repeat from step,(24).

To explain the details of OBMM, consider orders requiring two distinct components, $C_1$ and $C_2$, in varying quantities. Let $X_1$ and $X_2$ be the number of $C_1$ and $C_2$, respectively, needed by an order. For this example, assume, as before, that there is just one order type and both components have the same lead time (the more realistic situation of multiple order types and different lead times will be considered, below). Then, the order profile can be described by a random vector and its distribution:

$$X = \begin{bmatrix} X_1 \\ X_2 \end{bmatrix}$$

The Order-to-Order Variation is described by a multivariate normal distribution N($\mu$,V), called the "Order Profile Distribution". Let:

$E(X_1) = \mu_1$  $V(X_1) = \sigma_{11}$
$E(X_2) = \mu_2$  $V(X_2) = \sigma_{22}$
$Cov(X_1, X_2) = \sigma_{12} = \sigma_{21}$ Then, the mean vector and covariance matrix of the multivariate random vector $X = (X_1, X_2)^T$ (we use superscript T to represent the transpose of a vector or a matrix) are given by:

$$\mu = \begin{bmatrix} \mu_1 \\ \mu_2 \end{bmatrix}, \quad V = \begin{bmatrix} \sigma_{11} & \sigma_{12} \\ \sigma_{21} & \sigma_{22} \end{bmatrix}$$

Let the profile of order k be given by $$X_k = \begin{bmatrix} X_1^k \\ X_2^k \end{bmatrix}.$$

Then, TNO orders have a combined profile of:

$$\sum_{k=1}^{TNO_{t,(R+L)}} X_k = \begin{bmatrix} \sum_{k=1}^{TNO_{t,(R+L)}} X_1^k \\ \sum_{k=1}^{TNO_{t,(R+L)}} X_2^k \end{bmatrix} = \begin{bmatrix} D_1 \\ D_2 \end{bmatrix}$$

Then the component demand by $TNO_{t,(R+L)}$ orders follows a multivariate normal distribution $N(\mu_{TNO}, V_{TNO})$ with (Tong, 1990, Theorem 3.3.3., p. 32):

$$\mu_{TNO} = \sum_{i=1}^{TNO_{t,(R+L)}} \mu = (TNO_{t,(R+L)})\mu$$

and $$V_{TNO} = \sum_{i=1}^{TNO_{t,(R+L)}} V = (TNO_{t,(R+L)})V$$

Thus, if we determine the component order-up-to levels $S_1$ and $S_2$ for $C_1$ and $C_2$, respectively, to meet 100% of component level demand from TNO orders, the average order fill rate will be $\beta$. That is, $$P(D_1 \leq S_1, D_2 \leq S_2) = 1.0 \rightarrow \text{Order Fill Rate} \geq \beta$$

But, because this may result in high material buffer levels, we apply the type 1 service concept (Nahmias, 1993, pp.261–262) to determine $S_1$ and $S_2$ using $N(\mu_{TNO}, V_{TNO})$ so that $P(D_1 \leq S_1, D_2 \leq S_2) = \alpha$, where $\alpha$ is the service level (i.e probability of having no shortage when TNO orders are received in a cycle). The component order-up-to levels calculated this way will meet component demand from TNO orders $\alpha$100% of the time.

Given $P(D_1 \leq S_1, D_2 \leq S_2) = \alpha$, then, a lower bound on the order fill rate is given by:

$$\begin{pmatrix} \text{Effective} \\ \text{Order Fill} \\ \text{Rate} \end{pmatrix} = \alpha\beta + (1-\alpha) \begin{pmatrix} \text{Guaranteed} \\ \text{Order Fill Rate} \\ \text{with } S_1 \text{ and } S_2 \end{pmatrix},$$

where the guaranteed order fill rate with order-up-to levels $S_1$ and $S_2$ is found by decreasing TNO (and recalculating the mean vector and covariance matrix) until $P(D_1 \leq S_1, D_2 \leq S_2) \geq 0.9999 \ldots$ Thus, there is a tradeoff between $\alpha$ and $\beta$.

Specific Description of the Method

EXAMPLE 2

Two Order Types, Different Lead Times

The description given above assumed, for simplicity, that there was only one type of order (or, that all orders had the same profile). In reality, there may be a number of different types of orders, each with its own order profile. When there are multiple order types, a target number will be determined for each type. For each order type, its target number and order profile are combined to obtain a joint multivariate distribution of components that may be needed for the target number of orders of that type. These joint distributions for different order types are combined using the statistical properties of these distributions. This allows us to take advantage of the component commonalties between order types in determining component order-up-to levels.

It will be understood that the results presented here are valid for any number of 5 order types and components. For purposes of illustration, consider that there are two order types (with different profiles) requiring three different components $C_1$, $C_2$, and $C_3$. Suppose that type 1 orders require components $C_1$ and $C_2$, while type 2 orders require components $C_2$ and $C_3$. In this example, $C_2$ is the only component required by both order types. Then, $$X1 = \begin{bmatrix} X_1^1 \\ X_2^1 \end{bmatrix}, \quad X2 = \begin{bmatrix} X_2^2 \\ X_3^2 \end{bmatrix}$$

where $X^1_2$ and $X^2_2$ are the random numbers of component $C_2$ needed per order of type 1 and type 2, respectively. Using the order level forecasts, the target number of orders over the lead time plus review period for order type k, $TNO^k_{t,(R+L)}$, is calculated by:

$$TNO^k_{t,(R+L)} = F^k_{t,(R+L)} + z_k(\sigma^k_{t,(R+L)})^{0.5}$$

where:

$F^k_{t,(R+L)}$ is the forecast made at time t of the number of orders (starts) of type k expected during the next (R+L) periods, where L is the lead time and R is the review period.

$z_k$ is a safety factor for the desired order fill rate (fraction of orders filled directly from buffer (2)) of $\beta$. In other words, if the component buffer levels are set to meet possible component demand by up to the target number of orders ($TNO^k_{t,(R+L)}$) 100% of the time, then the average percentage of type k orders filled from the buffer will be $\beta$. The safety factor may be calculated by any of the known methods such as those recommended by Silver (1970) or Johnson, et. al (1995).

$\sigma^k_{t,(R+L)}$ is the variance of forecast error for order type k over the lead time plus review period.

Using a multinomial distribution with a mean vector $\mu^k$ and a covariance matrix $V^k$ to represent the profile of a type k order, we obtain a multinormal distribution for the component demand by $TNO^k_{t,(R+L)}$ orders of type k with a mean vector:

$$\mu^k_{TNO} = \sum_{i=1}^{TNO^k_{t,(R+L)}} \mu^k = (TNO^k_{t,(R+L)})\mu^k$$

and a covariance matrix $$V^k_{TNO} = \sum_{i=1}^{TNO^k_{t,(R+L)}} V^k = (TNO^k_{t,(R+L)})V^k$$

Let the component demand vectors for $TNO^1_{t,(R+L)}$ orders of type 1, and $TNO^2_{t,(R+L)}$ orders of type 2 be $$\begin{bmatrix} D_1^1 \\ D_2^1 \end{bmatrix}, \quad \begin{bmatrix} D_2^2 \\ D_3^2 \end{bmatrix},$$

respectively. In order to take advantage of component commonality, one needs the distribution of:

$$\begin{bmatrix} D_1^1 \\ D_2^1 + D_2^2 \\ D_3^2 \end{bmatrix}$$

where $(D^1_2+D^2_2)$ is the combined demand for component $C_2$.

According to Hausman, et. al, (1997, proof of Theorem 1), if X and Y are two independent multinormal variates with means $\mu_x$, $\mu_y$, and covariances $V_x$, $V_y$, then the augmented variate $(X,Y)^T$ is a multinomial variate with mean $(\mu_x, \mu_y)^T$ and covariance $$V = \begin{bmatrix} V_x & 0 \\ 0 & V_y \end{bmatrix}.$$

Using this procedure, the augmented distribution of $(D^1_1, D^1_2, D^2_2, D^2_3)^T$ is obtained as a multinormal distribution with parameters:

$$\mu = \begin{bmatrix} \mu_1^1 \\ \mu_2^1 \\ \mu_2^2 \\ \mu_3^2 \end{bmatrix},$$

$$V = \begin{bmatrix} \sigma_{11}^1 & \sigma_{12}^1 & 0 & 0 \\ \sigma_{21}^1 & \sigma_{22}^1 & 0 & 0 \\ 0 & 0 & \sigma_{22}^2 & \sigma_{23}^2 \\ 0 & 0 & \sigma_{32}^2 & \sigma_{33}^2 \end{bmatrix}$$

According to Tong, 1990, (Theorem 3.3.3, p.32), if X follows a multinormal distribution with a mean vector $\mu$ and a covariance matrix V, then Y=CX+b, where C is any given m×n real matrix with rank n≧m, and b is any m×1 real vector, follows a multinormal distribution with a mean vector (C$\mu$+b) and covariance matrix $CVC^T$. By applying this result with b=0, and with $$C = \begin{bmatrix} 1 & 0 & 0 & 0 \\ 0 & 1 & 1 & 0 \\ 0 & 0 & 0 & 1 \end{bmatrix},$$

parameters of the distribution of $(D^1_1, D^1_2, D^2_2, D^2_3)^T$ are obtained as:

$$\mu = \begin{bmatrix} \mu_1^1 \\ \mu_2^1 + \mu_2^2 \\ \mu_3^2 \end{bmatrix},$$

$$V = \begin{bmatrix} \sigma_{11}^1 & \sigma_{12}^1 & 0 \\ \sigma_{21}^1 & (\sigma_{22}^1 + \sigma_{22}^2) & \sigma_{23}^2 \\ 0 & \sigma_{32}^2 & \sigma_{33}^2 \end{bmatrix}$$

The Order-up-to levels for components $C_1$, $C_2$ and $C_3$ are determined using this distribution and $P(D_1 \leq S_1, D_2 \leq S_2, D_3 \leq S_3) = \alpha$ as described before.

A lower bound on the order fill rate can be calculated using the approach described before by decreasing $TNO^1_{t,(R+L)}$, and $TNO^2_{t,(R+L)}$ both until $P(D_1 \leq S_1, D_2 \leq S_2, D_3 \leq S_3) \geq 0.9999 \ldots$.

In actual practice, the lead time for each component may be different. Consider the previous case with orders requiring three components $C_1$, $C_2$, and $C_3$ with unequal lead times $L_1$, $L_2$, and $L_3$, respectively. Without losing generality, we assume $L_1 > L_2 > L_3$ (equality of lead times are discussed below). If all order-up-to levels are determined for the longest lead time, $L_1$, this will cause excessive stock levels (both cycle and safety) for $C_2$ and $C_3$ (which have the shorter lead times of $L_2$ and $L_3$), due to early material arrival and coverage over a longer period than needed. Also, order quantities for $C_2$ and $C_3$ will be determined using inaccurate forecasts (i.e. farther in to the future then $L_2$, and $L_3$ periods).

Description of the Recursion of the Method

To eliminate these inefficiencies, OBMM recursively recalculates order-up-to points (steps (24)–(32), FIG. 2). This recursion is explained in more detail below, and shown in the flowchart in FIG. 3 (which details the steps in FIG. 2 enclosed in the dotted lines labeled "3").

Note that FIG. 3 shows the recursion in a general sense, for n order types and k components, while the discussion below follows the recursion process for the two order type and three component type example above. For the purpose of this discussion, it is assumed that the lead times of the three components are different, and the components have been arranged in decreasing order of lead times, so that $L_1 > L_2 > L_3$. It will be understood by one skilled in the art how the specific example below translates into the general procedure of the flowchart of FIG. 3.

In the example discussed above, the recursive process done as follows: At each review point, update on-order and on-hand quantities of $C_1$, $C_2$, and $C_3$. Determine the order-up-to levels and order quantities as follows:

(enter from step 23, with i=1)

Step 40, Iteration 1:
  Consider component $C_1$.
  Determine $TNO^1$, and $TNO^2$ for $(L_1+R)$ periods Step 41, Iteration 1:
  Since there are no components with a longer lead time than $L_1$, by definition, this step is not executed in this iteration.

Step 42, Iteration 1:
  Determine the mean vector $\mu$, and covariance matrix V for the combined demand distribution of components $C_1$, $C_2$, and $C_3$ for $TNO^1$, and $TNO^2$ orders Step 43, Iteration 1:
  Combine the mean vector $\mu$, and covariance matrix V for $TNO^1$ and $TNO^2$, for the combined demand distribution for components $C_1$, $C_2$, and $C_3$.

Step 44, Iteration 1:
  Calculate the order-up-to points $S_1$, $S_2$ and $S_3$ from $P(D_1 \leq S_1, D_2 \leq S_2, D_3 \leq S_3) = \alpha$
  Since i<2, we do not use the available quantities or order-up-to levels.

Step 45, Iteration 1:
  Check if it is possible to reach $\alpha$.
  If it is, proceed to step 46.
  If it is not,
  Step 50: Reduce $TNO^1$ and $TNO^2$ for $(L_1+R)$ periods, and loop back to step 42.

Step 46, Iteration 1:
  Check if order-up-to point $S_1$ is less than or equal to the maximum consumption capacity. If it is not (i.e. cannot get as many $C_1$ as needed), (step 51) set $S_1$ to the maximum consumption capacity.

Step 47, Iteration 1:
Place an order for $C_1$ for Max{0, $S_1$–(on-hand inventory)–(on-order quantity)}.

Step 48, Iteration 1:
$S_2$ and $S_3$ will be used for planning purposes only. Do not use $S_2$ or $S_3$ for ordering, as these will be recalculated.
(from FIG. 2, perform step 28 (i=2) and step 30–compare i(=2) to k(=3) and loop back)

Step 40, Iteration 2:
Consider component $C_2$.
Recalculate $TNO^1$, and $TNO^2$ over $(R+L_2)$ periods.

Step 41, Iteration 2:
Determine for component $C_1$, available quantities over $(L_2+R)$:
$H_1$=(on hand inventory)+(arrivals expected over the next $L_2+R$ periods)

Step 42, Iteration 2:
Determine the mean vector $\mu$, and covariance matrix V for the[combined] demand distribution of components $C_1$, $C_2$, and $C_3$ for $TNO^1$, and TNO2 orders Step 43, Iteration 2:
Combine the mean vector $\mu$, and covariance matrix V for $TNO^1$ and $TNO^2$, for the combined demand distribution for components $C_1$, $C_2$, and $C_3$ Step 44, Iteration 2:
Calculate the order-up-to points $S_2$ and $S_3$ from $P(D_1 \leq S_1, D_2 \leq S_2, D_3 \leq S_3) = \alpha$, using the available quantity $H_1$ for order-up-to level $S_1$ Step 45, Iteration 2:
Check if it is possible to reach $\alpha$.
If it is, proceed to step 46.
If it is not,
Step 50: Reduce $TNO^1$ and $TNO^2$ for $(L_2+R)$ periods, and loop back to step 42.

Step 46, Iteration 2:
Check if order-up-to point $S_2$ is less than or equal to the maximum consumption capacity. If it is not (i.e. cannot get as many $C_2$ as needed), (step 51) set $S_2$ to the maximum consumption capacity.

Step 47, Iteration 2:
Place an order for $C_2$ for Max{0, $S_2$–(on-hand inventory)–(on-order quantity)}.

Step 48, Iteration 2:
$S_3$ will be used for planning purposes only. Do not use $S_3$ for ordering, as it will be recalculated.
(from FIG. 2, perform step 28 (i=3) and step 29–compare i(=3) to k(=3) and loop back)

Step 40, Iteration 3:
Consider Component $C_3$
Recalculate $TNO^1$, and $TNO^2$ over $(R+L_3)$ periods.

Step 41, Iteration 3:
Determine for components $C_1$ and $C_2$, available quantities over $(L_3+R)$:
$H_1$=(on hand inventory)+(arrivals expected over the next $L_3+R$ periods)
$H_2$=(on hand inventory)+(arrivals expected over the next $L_3+R$ periods)

Step 42, Iteration 3:
Determine the mean vector $\mu$, and covariance matrix V for the [combined] demand distribution of components $C_1$, $C_2$, and $C_3$ for $TNO^1$, and $TNO^2$ orders Step 43, Iteration 3:
Combine the mean vector $\mu$, and covariance matrix V for $TNO^1$ and $TNO^2$, for the combined demand distribution for components $C_1$, $C_2$, and $C_3$ Step 44, Iteration 3:
Calculate the order-up-to point $S_3$ from $P(D_1 \leq S_1, D_2 \leq S_2, D_3 \leq S_3) = \alpha$, using the available quantities $H_1$ and $H_2$ for order-up-to levels $S_1$ and $S_2$ Step 45, Iteration 3:
Check if it is possible to reach $\alpha$.
If it is, proceed to step 46.
If it is not,
Step 50: Reduce $TNO^1$ and $TNO^2$ for $(L_3+R)$ periods, and loop back to step 42.

Step 46, Iteration 3:
Check if order-up-to point $S_3$ is less than or equal to the maximum consumption capacity. If it is not (i.e. cannot get as many $C_3$ as needed), (step 51) set $S_3$ to the maximum consumption capacity.

Step 47, Iteration 3:
Place an order for $C_3$ for Max{0, $S_3$–(on hand inventory)–(on order quantity)}.

Step 48, Iteration 3: (no i+1–this step not executed)
(from FIG. 2, perform step 28 (i=4) and step 29–compare i(=4) to k(=3) and stop)

In determining the component order-upto levels in this fashion, two situations may require redetermination of $\alpha$, both of which are incorporated in the discussion above:

First, as one calculates order-up-to levels for components with shorter lead times, reaching a service level of $\alpha$ with the expected deliveries of the components with longer lead times (quantities denoted by $H_i$ above) may not be possible (step 44). When this is observed for a component, order-up-to levels for all components have to be recalculated by lowering the service level incrementally until a feasible level is reached (step 50).

In other situations, there may be a limit on the number of components that can be consumed even when the facility is run at the maximum capacity level. If the order-up-to level for a component exceeds this level (step 46), this means the desired order fill rate is not realistic due to capacity shortage. In this case, the achievable order fill rate is obtained by setting the order-up-to point to the maximum capacity (step 51).

Accordingly, it is to be understood that the embodiments of the invention herein described are merely illustrative of the application of the principles of the invention. Reference herein to details of the illustrated embodiments are not intended to limit the scope of the claims, which themselves recite those features regarded as essential to the invention.

REFERENCES

Hausman, W. H., H. L. Lee, and A. X. Zhang, "Joint Demand Fulfillment Probability in a Multi-Item Inventory System with Independent Order-Up-To Policies," *European Journal of Operational Research*, 101–114, 1997.

Johnson, E. M., H. L. Lee, T. Davis, and R. Hall, "Expressions for Item Fill Rates in Periodic Inventory Systems," *Naval Research Logistics*, 57–80, 1995.

Nahmias, S., *Production and Operations Analysis*, $2^{nd}$ ed., Irwin Publ., 1993.

Silver, E. A., "A Modified Formula for Calculating Customer Service Under Continuous Inventory Review," *AIIE Transactions*, 241–245, 1970.

Silver, E. A., D. E. Pyke, and R. Peterson, *Inventory Management and Production Scheduling*, $3^{rd}$ ed., John Wiley and Sons, 1998.

Tong, Y. L., *The Multivariate Normal Distribution*, Springer-Verlag, New York, 1990.

What is claimed is:

1. An order-based material management method for managing a plurality of customer orders of a plurality of order types, each order comprising a plurality of components that vary from one order to another, the method comprising the steps of:

a) setting a desired order fill rate, wherein said order fill rate is an average percentage of the times all components needed for an order will be available in inventory in required quantities when the order arrives;

b) establishing order profiles for each type of order to describe order-to-order variability, wherein said order profiles are represented by ajoint normal probability distribution of a plurality of variables, wherein each random variable represents an uncertain number of units of a component that may be needed to build a customer order of that type;

c) determining a lead time for each component required by each type of order and arranging the lead times in order by length of time;

d) choosing a component having the longest lead time;

e) forecasting a quantity of expected customer orders for each type of order over the lead time of the chosen component plus one review period;

f) computing a target number of orders for each of the order types at the order fill rate;

g) computing available quantities over the lead time of the chosen component plus one review period of components having lead times greater than the chosen component;

h) computing a component requirements distribution for the target number of orders determined in step (f) for each of the order types;

i) combining, through augmentation and transformation, the components requirements distributions for all of the order types determined in step (h) into a components requirements distribution for all order types;

j) determining needed component inventory levels over the lead time of the chosen component plus one review period for all components having a lead time which is the same as or less than the chosen component, using the component inventory levels of all components having lead times greater than the chosen component;

k) ordering components required to attain the inventory levels determined in step (j) for the chosen component and all other components with the same lead time; and l) choosing another component, having a lead time less than the chosen component;

m) repeating the method from steps (e) through (l), until all components have been chosen.

2. The order-based material management method of claim 1, further comprising the steps, after step (m) of n) evaluating actual lead times and order levels during a predetermined period;

o) revising the forecasts in accordance with the evaluation of step (n); and p) repeating the method from step (e).

3. The order-based material management method of claim 1, in which the predetermined period is a period comprising a lead time plus a review period.

4. The order-based material management method of claim 3, in which the lead times for the components are used in step (h) as a factor in computing the component requirements distribution.

5. The order-based material management method of claim 4, in which the order profile includes at least one factor giving a correlation between the numbers of units of every two different components needed for an order type.

6. The order-based material management method of claim 1, in which the target number of orders is calculated as:

$$TNO_{t,(R+L)} = F_{t,(R+L)} + z(\sigma_{t,(R+L)})^{0.5}$$

where $F_{t,(R+L)}$ is the forecast, made at time t of the number of orders during the next (R+L) periods, where L is the lead time and R is a review period; z is a safety factor for a desired order fill rate; and $\sigma_{t,(R+L)}$ is a variance of forecast error over the lead time plus review period.

7. The order-based material management method of claim 6, in which the order profile includes at least one factor giving a correlation between the numbers of every two units of different components needed for an order type.

8. The order-based material management method of claim 6, in which the target number of orders is calculated for each order type.

9. The order-based material management method of claim 1, in which the component requirements distribution of step (h) for each order type k is determined by the steps of:

$$\text{calculating a mean vector } \mu^k: \mu^k_{TNO} = \sum_{i=1}^{TNO^k_{t,(R+L)}} \mu^k$$

$$= (TNO^k_{t,(R+L)})\mu^k;$$

$$\text{calculating a covariance matrix } V: V^k_{TNO} = \sum_{i=1}^{TNO^k_{t,(R+L)}} V^k$$

$$= (TNO^k_{t,(R+L)})V^k;$$

combining said requirements distribution for different order types through an augmented distribution of demand vectors;

where $TNO^k_{t,(R+L)}$ is the forecast total number of orders, made at time t of the number of orders of type k during the next (R+L) periods, where L is the lead time and R is the review period.

10. The order-based material management method of claim 9, in which the order-up-to levels of step (e) are determined from the augmented distribution of demand vectors and the desired order fill rate.

11. The order-based material management method of claim 9, in which the component inventory levels of step (j) are determined from the augmented distribution of demand vectors and a predetermined order fill rate.

12. The order-based material management method of claim 9, further comprising, after the substep of combining said requirements distribution for different order types through an augmented distribution of demand vectors, the substep of transforming said requirements distribution of said demand vectors to obtain an overall component distribution.

13. An order-based material management method for managing a plurality of customer orders of a plurality of order types, each order comprising a plurality of components that vary from one order to another, the method comprising the steps of:

a) setting a desired order fill rate, wherein said order fill rate is an average percentage of the times all components needed for an order will be available in inventory in required quantities when the order arrives;

b) establishing order profiles for each type of order to describe order-to-order variability, wherein said order profiles are represented by a joint normal probability distribution of a plurality of variables, wherein each random variable represents an uncertain number of units of a component that may be needed to build a customer order of that type;

c) forecasting a quantity of expected customer orders for each type of order for a predetermined period;

d) combining the forecast quantities of customer orders with the associated order profiles to determine an overall multivariate component demand distribution for the plurality of components; and e) from the multivariate component distribution, determine order-up-levels for each of the components to achieve the desired order fill rate.

14. The order-based material management method of claim 13, further comprising the step of:

f) ordering at least one of the components based on the order-up-to level from step (e) and an on hand inventory and an on order quantity for the component.

15. The order-based material management method of claim 13, further comprising the step of determining a lead time for each component in the order profile for each type of order.

16. The order-based material management method of claim 15, in which the lead times for the components are used in step (d) as a factor in computing the component demand distribution.

17. The order-based material management method of claim 16, which the components are ordered by their associated lead times, and the order-up-to levels determined in step (e) are computed iteratively using the ordered lead times of the components.

18. The order-based material management method of claim 13, in which the order profile includes a correlation between the numbers of units of every two different components needed for an order type.

19. The order-based material management method of claim 13, in which the component demand distribution of step (d) for each order type k is determined by the steps of:

$$\text{calculating a mean vector } \mu^k: \mu^k_{TNO} = \sum_{i=1}^{TNO^k_{t,(R+L)}} \mu^k$$
$$= (TNO^k_{t,(R+L)})\mu^k;$$

$$\text{calculating a covariance matrix } V: V^k_{TNO} = \sum_{i=1}^{TNO^k_{t,(R+L)}} V^k$$
$$= (TNO^k_{t,(R+L)})V^k;$$

combining said requirements distribution for different order types through an augmented disribution of demand vectors;

where $TNO^k_{t,(R+L)}$ is the forecast total number of orders, made at time t of the number of orders of type k during the next (R+L) periods, where L is the lead time and R is the review period.

20. The order-based material management method of claim 19, in which the order-up-to levels of step (e) are determined from the augmented distribution of demand vectors and the desired order fill rate.

* * * * *